G. W. Lowry,
Bee Hive.
No. 96,712.  Patented Nov. 9, 1869.
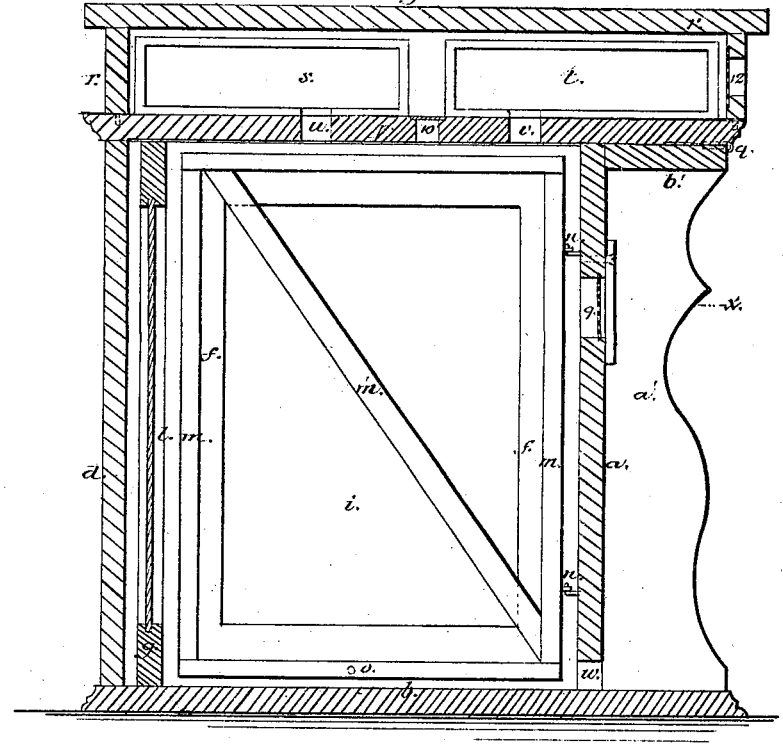
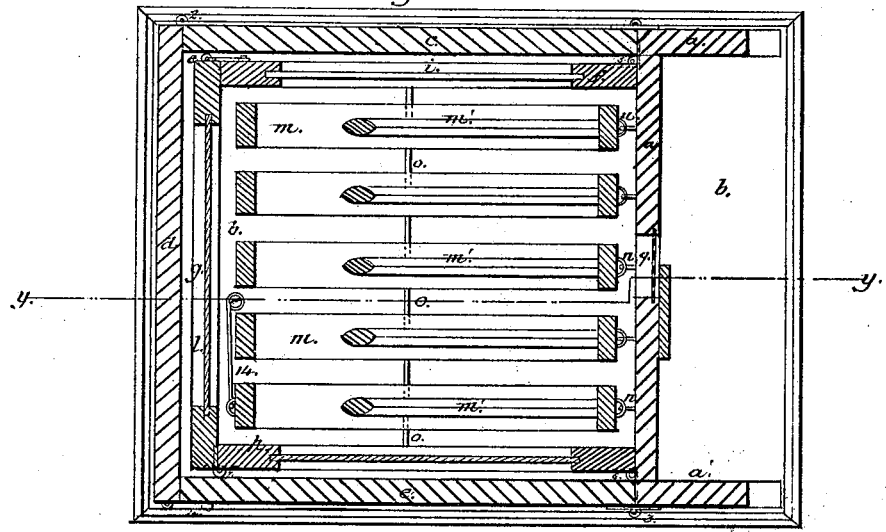

United States Patent Office.

GEORGE W. LOWRY, OF LAVANSVILLE, PENNSYLVANIA.

Letters Patent No. 96,712, dated November 9, 1869.

IMPROVEMENT IN BEE-HIVES.

The Schedule referred to in these Letters Patent and making part of the same.

*To all whom it may concern:*

Be it known that I, GEORGE W. LOWRY, of Lavansville, in the county of Somerset, and State of Pennsylvania, have invented and made a new and useful Improvement in Bee-Hives; and I do hereby declare the following to be a full, clear, and exact description of the said invention, reference being had to the annexed drawing, making part of this specification, wherein—

Figure 1 is a vertical section, at the line $y\ y$, of said hive, in its ordinary closed position, and Figure 2 is a sectional plan of the same, at the line $x\ x$.

Similar letters denote the same parts.

My invention is devised with the object in view of rendering the hive sufficiently strong and firm for handling or transportation, and at the same time give easy access to the top and three sides of the hive for observing the bees, removing the frames with the comb, facilitating swarming, and removing moths and insects or worms, that are injurious to the bees.

I make my hive with a vertical front, firmly connected with the bottom, so that these parts will sustain all the other portions of the hive.

I hinge the three swinging sides to the vertical front piece, and also employ hinged swinging sashes within the sides, and a removable top, set upon a base that is hinged to the front.

By this construction, the combs can be examined on both sides without removal from the hive, the amount of bees can be determined, the progress of the brood, or the number or existence of queen cells, so as to facilitate artificial swarming, thus enabling the apiarist to attend to the bees with greater facility than heretofore.

In the drawing—

$a$ is the front of the hive, firmly united to the bottom $b$, and these parts are still further strengthened by the side pieces $a'\ a'$ and top piece $b'$.

To the front edge of the stationary top piece $b'$, the top $p$ of the hive is hinged, as at $q$, and above this is the removable cover $r$, setting over the boxes $s$ and $t$, that are provided with the openings $u\ v$, as usual, for the bees.

In the top are the ventilating holes, 10 and 12, covered with wire gauze.

At the vertical angles of the front $a$, I attach the swinging sides $c\ e$, by means of hinges, 1, 3, and the back $d$ is hinged at 2 to the side $c$, and a hook, at 4, unites the swinging sides, and allows of their being opened easily for inspecting the combs.

I prefer also to employ the interior sashes $f\ g\ h$, hinged at 5 and 6, to the front $a$. The sashes $g\ h$ are hinged at 7, and a hook is provided at 8.

By this construction, the progress of building the comb can be observed without disturbing the bees, or access can be given to the interior, if desired.

In consequence of the three sides being fitted to swing, access is given to all parts of the hive, for the purpose before named, and the top $p$, of the hive, being also hinged, greatly facilitates access for removing the comb.

The frames $m$ are supported by eyes $n$ on one edge, passing over hooks that project from the back of the front $a$.

Projecting pins, at $o$ keep the frames at equal distances apart, and a hook, 14, attached to the bottom $b$, and taking an eye on one of the frames $m$, steadies them when the sashes $f\ g\ h$, with the glasses $i\ l$ are swung back to give access to the frames. Either one of the frames may be removed from the back or from the top of the hive by lifting the eyes $n$ off the hooks.

The frames $m$ have diagonal bars $m'$, which stiffen said frames, and also insure the comb being made straight, especially if the hive is set at a slight inclination, the back of the hive being placed the highest, the bees will commence the comb at the highest point where the diagonal bar $m'$ unites with the frame.

The entrance for the bees is made at $w$, and a ventilator and cover are provided at 9.

This hive I have found to be superior to those before employed in the particulars before set forth.

The top board $p$ being hinged to and sustained by the stationary front $a\ b'$, allows the boxes $s\ t$, and top $p\ r$, to remain in position when the sides $c\ d\ e$ or sashes $f\ g\ h$ are swung back.

I do not claim the swinging sides or sashes, as these have before been used.

I claim, as my invention—

1. The top $p$, hinged at $q$, to the front edge of the stationary front $a\ b'$, in combination with the swinging sides $c\ e$, and the removable cover $r$, enclosing the boxes $s\ t$, but allowing easy access to the same and to the frames $m$, from above, as set forth.

2. The pins $o\ o$, and hook 14, combined with the hinged frames $m\ m$, for retaining said frames in position, as specified.

In witness whereof, I have hereunto set my signature, this 28th day of June, A. D. 1869.

G. W. LOWRY.

Witnesses:
ELIJAH CHORPENING,
G. M. PILE.